Dec. 28, 1965 L. W. LECKLITER 3,226,525
HYDROELECTRIC SPOT-WELDING DEVICE
Filed March 31, 1964 4 Sheets-Sheet 1

INVENTOR.
LAURENCE W. LECKLITER
BY
ATTORNEYS

Dec. 28, 1965　　　　L. W. LECKLITER　　　　3,226,525
HYDROELECTRIC SPOT-WELDING DEVICE
Filed March 31, 1964　　　　　　　　　　　4 Sheets-Sheet 3

INVENTOR.
LAURENCE W. LECKLITER
BY
ATTORNEYS

Dec. 28, 1965   L. W. LECKLITER   3,226,525
HYDROELECTRIC SPOT-WELDING DEVICE
Filed March 31, 1964                               4 Sheets-Sheet 4

INVENTOR.
LAURENCE W. LECKLITER
BY
ATTORNEYS

United States Patent Office 3,226,525
Patented Dec. 28, 1965

3,226,525
HYDROELECTRIC SPOT-WELDING DEVICE
Laurence W. Leckliter, St. Paul, Minn., assignor, by mesne assignments, to the United States of America as represented by the Secretary of the Air Force
Filed Mar. 31, 1964, Ser. No. 356,337
6 Claims. (Cl. 219—89)

This invention relates to spot-welding devices and has for an object to provide apparatus for obtaining more uniform welded joints of either small wire-to-wire, or thin ribbon-to-ribbon members.

A further object is the provision of a spot-welding apparatus controlled in a closed hydraulic system, including means making it possible to reduce the inertia and increase the follow-up speed on the welding electrodes at the instant the weld is made.

The invention further relates to a novel spot-welding device or system for insuring more satisfactory welding operations for joining fine wires, thin ribbons, or combinations of the same, such as are used in fabricating wire or ribbon matrices, interconnecting electrical components, etc., the invention being more applicable to spot welding which fuses two work pieces together by a short duration electric current of low voltage and high amperage, for instance, approximately 2000 amperes at around 3–6 volts, in which an increasing clamping or follow-up pressure of the welding electrodes on the work pieces is provided at and during the actual welding operation.

A further object is the provision of a welding head in which the welding or work clamping electrodes are adjustable through an arc of 90° whereby to receive the "work pieces" therebetween in a vertical or in a horizontal plane.

A further object is the provision of a simple spot-welding device for welding fine wires and metallic strips in which one of the welding electrodes is pivoted for movement toward the other electrode to clamp the work to be welded therebetween, including a hydraulic bellows device for moving the movable electrode, and a treadle means providing an accelerated increasing hydraulic pressure incident to progressive uniform depression of a treadle, and means for closing an electric welding circuit to said electrodes by said treadle during the final downward depression of the treadle while providing a simultaneous increase in hydraulic pressure effective on the movable electrode to produce an increased follow-up pressure of the electrodes on the work during the energizing of the welded circuit.

A further object includes a welding device for fine wires and thin metallic strips which includes a stationary elongated electrode holder and a pivoted substantially parallel elongated electrode holder, including a hydraulic bellows device for moving the pivoted electrode holder toward and away from the stationary electrode holder, in which said electrode holders carry elongated adjustable work clamping and welding electrodes in the outer extremities thereof disposed in substantially 90° angular relation to each other and to the longitudinal axes of the elongated electrode holders and the provision of a treadle device which is depressible to progressively increase the hydraulic pressure in the bellows device to provide increasing pressure for movement of the pivoted electrode toward the stationary electrode to clamp the work therebetween followed by an increasing follow-up pressure on the work during uniform depression of the treadle, including switch means in the path of movement of the treadle for energizing the electrodes during the depression of the treadle.

A further object includes resilient means under control of the treadle device for initially applying a light preliminary hydraulic pressure in the bellows device to initially move the electrodes toward each other to clamp the work under a lighter initial pressure during the final portion of the depression of the treadle.

Other objects and advantages of the invention will become apparent from the following description and accompanying drawings in which like reference characters refer to like parts in the several figures.

Figure 1:
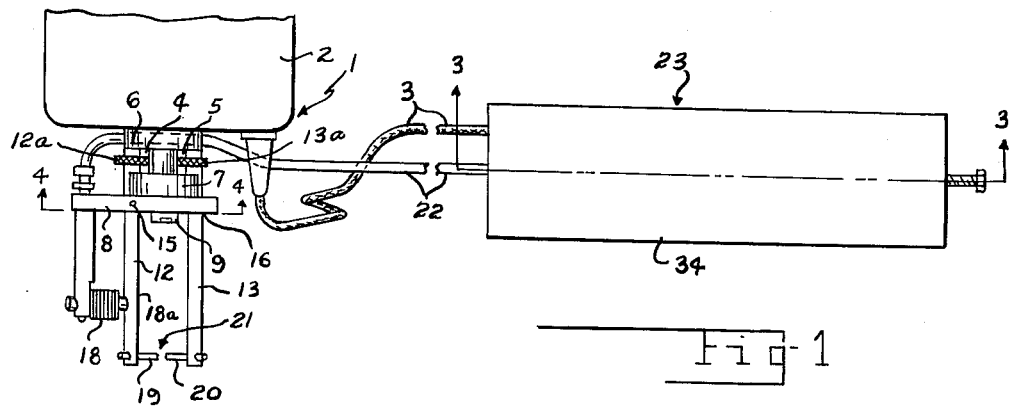
FIGURE 1 is a top plan view of a preferred form of the spot-welding device, incorporating the invention.

In the drawings, the reference numeral 1 denotes a spot-welding head, which, as shown, is mounted horizontally on a conventional "power pack" or transformer 2 suitably controlled by an energizing circuit 3, the power pack 2 containing an energizing relay for energizing the transformer in any suitable conventional manner and therefore these details are not thought necessary to be illustrated.

Figure 4:
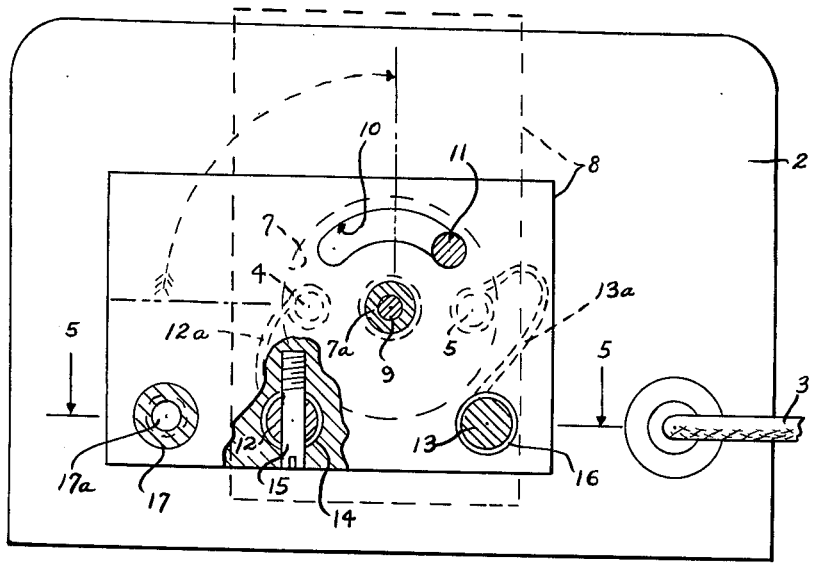
FIGURE 4 is a detail sectional view taken about on line 4—4 in FIGURE 1, looking in the direction of the arrows, showing the adjustment of the welding head diagrammatically in dotted lines.

The power pack or transformer unit 2, as shown in FIGURES 1 and 4, has spaced electrical "output" terminals or poles 4 and 5, insulated from each other of course, and the conventional input or primary circuit is not shown. However, the secondary, also not shown, is constructed and arranged to deliver an output current through the poles 4 and 5 of about 2000 amperes at about, or between 3 to 6 volts for the particular type of spot-welding operation for which the device is intended when the circuit is closed.

Figure 2:
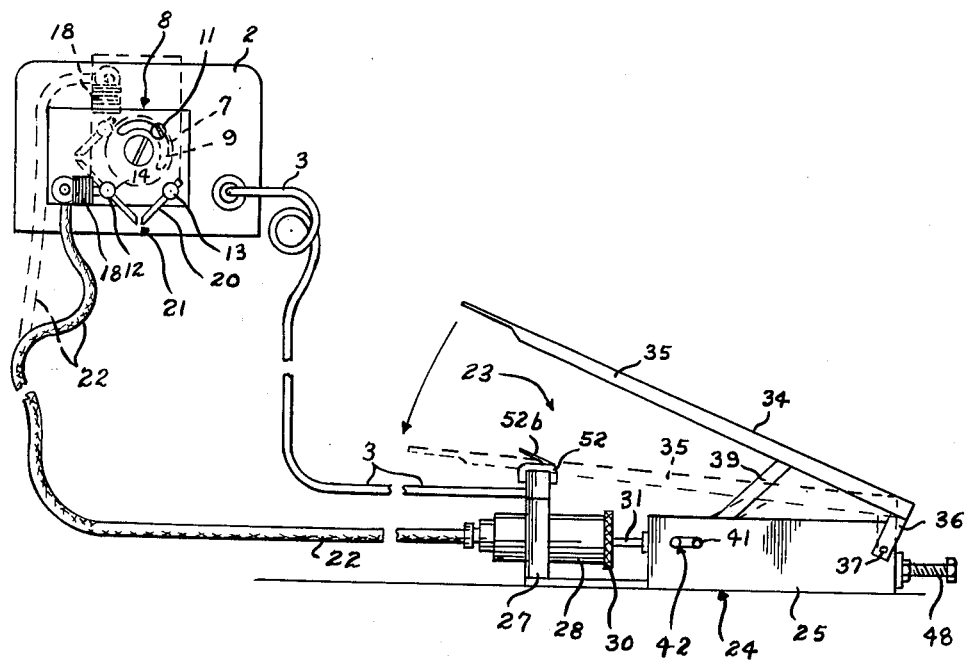
FIGURE 2 is a side elevation of the welding device shown in FIGURE 1, showing the adjustment of the welding head in dotted lines.

As shown in FIGURES 2 and 4, the power supply unit 2 has a welding unit support 6 projecting horizontally from the case or housing which surrounds the pole terminals 4 and 5 and terminating in an outer bearing plate or disk 7 on which is rotatably mounted a rectangular supporting plate 8, adjustable in a vertical plane through an arc of 90° (as shown in dotted lines in FIGURES 2 and 4), the plate 8 being retained on a trunnion bearing 7a by a cap screw 9.

The adjustable supporting plate 8 is formed with the arcuate 90° slot 10 through which a stop and clamping screw 11 extends for securing the plate 8, and thus the welding terminals 19 and 20, in adjusted positions through an arc of 90°.

Figure 5:
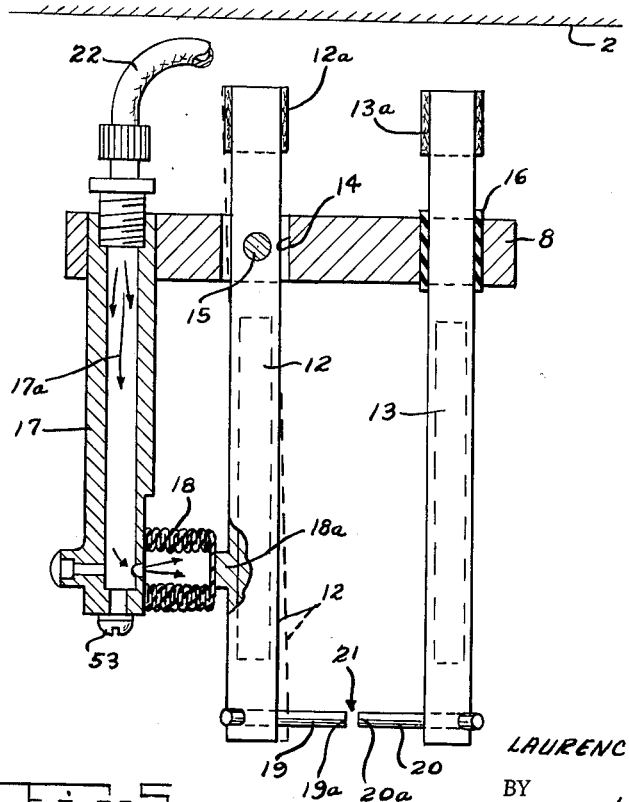
FIGURE 5 is also a detail sectional view taken about on line 5—5 in FIGURE 4 looking in the direction of the arrows.

The adjustable supporting plate 8 carries a spaced pair of welding electrode supporting rods or posts 12 and 13 therein which are substantially perpendicular to the plane of the plate 8, and extend outwardly, as seen in FIGURES 1 and 5, preferably horizontally. They may be hollow, if desired, the inner ends thereof projecting through the supporting plate 8 are each connected electrically to one of the terminal poles 4 and 5 by suitable braided (flexible) connectors 12a and 13a.

The electrode supporting rod 12 extends through a slot opening 14 in the plate 8, being pivoted for swinging movement on a pivot pin 15 toward and away from the other electrode supporting rod 13, while the electrode supporting rod 13 is mounted in fixed relation in the plate 8 substantially as shown, being insulated therefrom (for instance by an insulating sleeve 16).

In the outer corner of the adjustable plate 8, in a plane through the axes of the two electrode supporting rods 12 and 13 and in spaced relation to the supporting rod 12 and preferably parallel to the supporting rod 13 is fixed a projecting tubular hydraulic bellows supporting member 17 having an inner fluid conduit or chamber 17a in communication at its lower end portion with the interior of an expansible pressure chamber or metallic bellows device 18 which is fixed to member 17 at one end with its opposite end 18a fixed to the side of the pivoted electrode support rod 12.

Thus it will be seen that hydraulic pressure introduced into the bellows 18 through the chamber 17a will force the outer end of the electrode support rod 12 toward fixed electrode support rod 13 while withdrawal of pressure and contraction of the bellows 18 will rock the electrode support 12 about the pivot 15 in the opposite direction away from the electrode support 13.

Extending from the outer end portions of the welding electrode supporting rods 12 and 13, in 90° angular relation to each other and to the axes of the rods 12 and 13, are a pair of "spot-welding" electrode members 19 and 20 having a work receiving gap 21 therebetween as best seen in FIGURES 1, 2, and 5. The adjacent extremities of the electrodes at the gap 21 are finished in parallel planes for parallel contact with any of the work to be spot welded, such as fine wires, thin stripes, and the like, when interposed in the gap 21.

The electrodes 19 and 20 may be axially adjusted in any suitable manner to change the width of the work recovery gap 21, also any suitable means may be provided for fixing the electrodes in the desired adjusted electrical contacting relation on the end portions of the electrode supports 12 and 13.

Hydraulic pressure is supplied to the bellows device 18 preferably through a suitable flexible pressure conduit 22, connected to the treadle actuator and control device indicated generally at 23.

Figure 3:
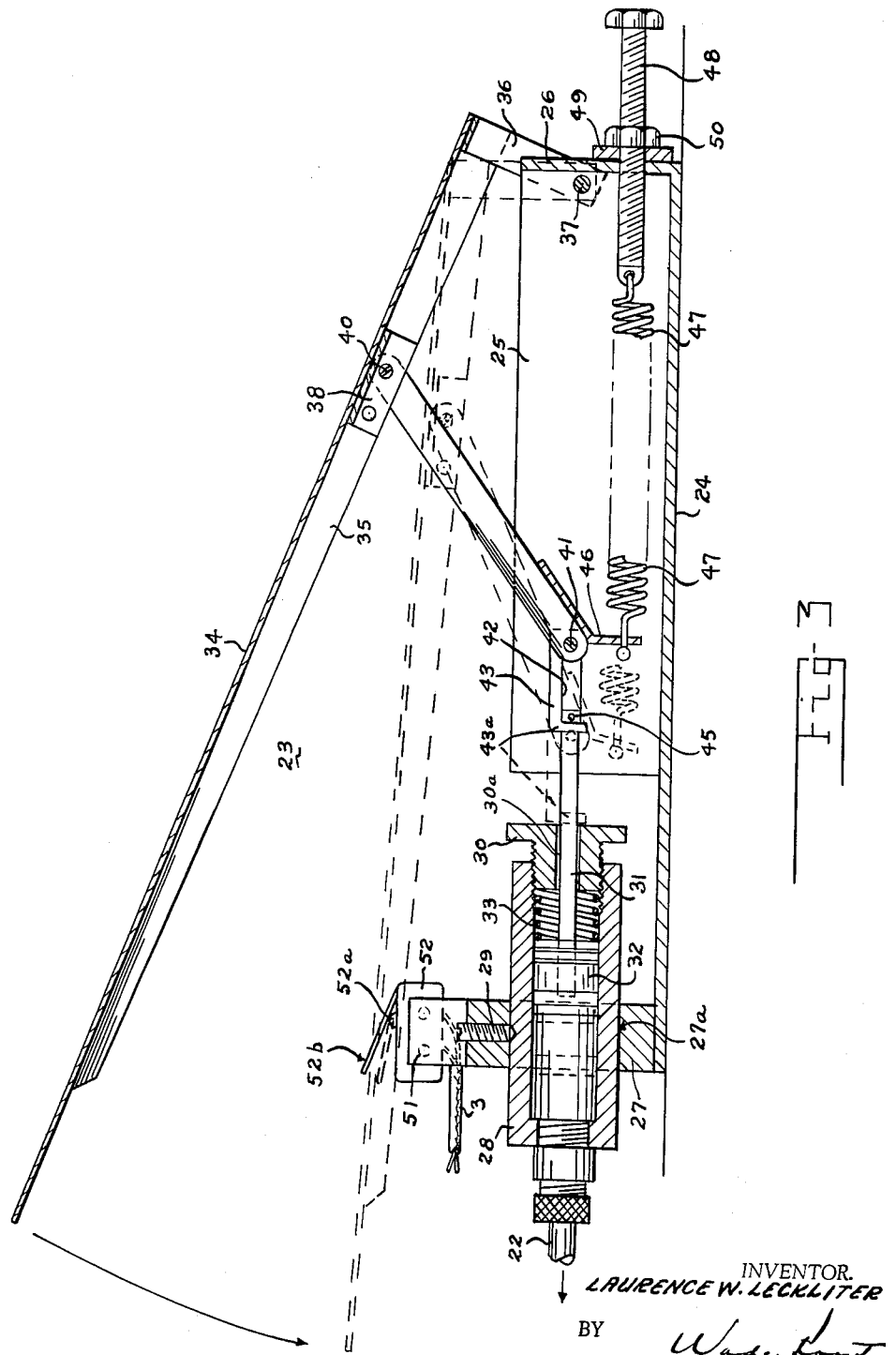
FIGURE 3 is an enlarged longitudinal sectional view through the treadle unit of the device, taken about on the plane indicated by line 3—3 of FIGURE 1, certain parts thereof being shown in elevation.
Figure 6:
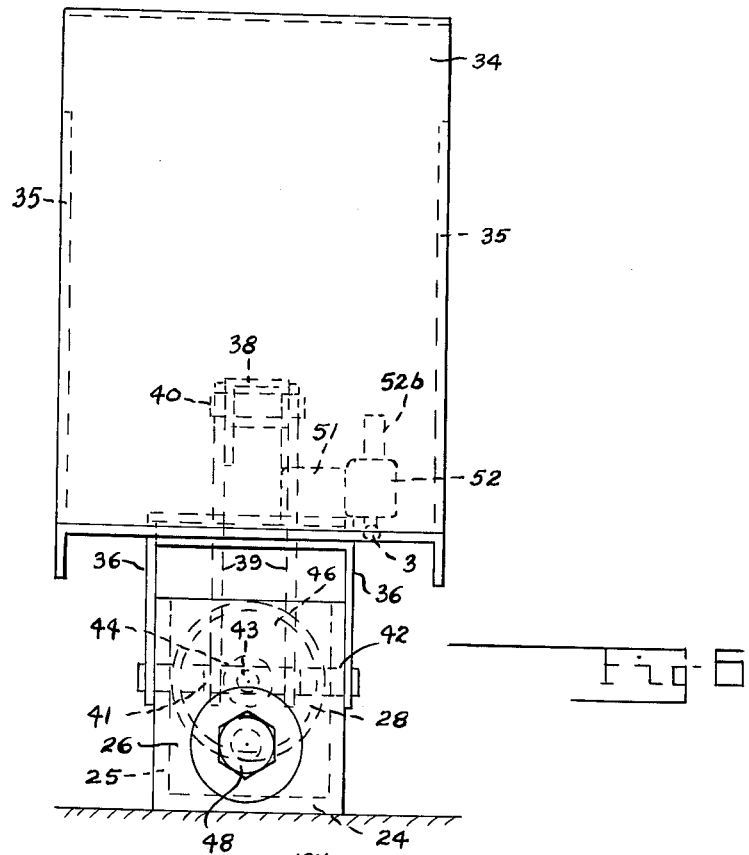
FIGURE 6 is an end elevation of the treadle unit as seen in FIGURES 2 and 3.

The treadle actuating control device 23 forms an important part of the invention and comprises, as best seen in FIGURES 3 and 6, a base 24 having upstanding sides and a rear end wall, indicated at 25 and 26.

Upstanding from the forward end of the base 24 is a fixed hydraulic cylinder supporting member or plate 27, apertured at 27a to adjustably receive a "master" hydraulic cylinder 28 which is connected at one end in communication with the conduit 22. The cylinder 28 is axially adjustable in the plate member 27 and retained in any fixed axial adjustment by a set screw (or other suitable means) 29. A cap 30 closes the opposite end of the cylinder 28, the cap having a piston rod guide opening 30a through which a piston rod 31 extends having a piston 32 (with suitable packing rings) within the cylinder 28 fixed on rod 31. A suitable light compressing coil spring 33 may be interposed in the cylinder between the piston 32 and the cap 30, if desired, tending to move the piston to the left as seen in FIGURE 3 when the piston rod 31 is released to cause a light work "holding" pressure between the electrodes 19 and 20 during the depression of the treadle member 34.

The treadle member 34 comprises a plate flanged at its opposite longitudinal edges at 35 having fixed right angularly disposed arms 36 extending downwardly along the outer sides of the side walls 25 and pivoted on a cross pin 37, forming the pivot for depression of the treadle.

Fixed outwardly along the under side of the treadle plate 34 is a bracket 38 having transversely spaced side flanges to which spaced parallel actuating link members 39 are pivoted (at 40).

The link members 39 incline downwardly between the side walls 25 and are pivoted in spaced relation to each other on a lower cross rod or pivot pin 41. The opposite ends of the cross rod 41 are slidably disposed in slots 42 formed in the side walls 25 in a horizontal plane, preferably extending through the axis of the piston rod 31.

Pivoted on the cross rod 41, between the link members 39 is a somewhat U-shaped piston rod actuator 43 having a downwardly extending apertured portion 43a through which the piston rod 31 slidably extends.

A stop pin 45 projects through the outer extremity of the piston rod 31 in the path of the downwardly extending portion 43a when the treadle is raised, to draw the piston and rod to the right and thus compress the light spring 33 and then to create suction in the hydraulic cylinder 28, line 22, and bellows 18 to rock the electrode supporting rod 12 (and electrode 19) away from the electrode 20 to release the work.

Means are provided for raising the treadle plate to full line position as shown in FIG. 3, comprising an angularly bent plate fixed across the lower ends of the links 39 having an aperture 46a therein for securing one end of a treadle return spring 47 thereto, the opposite end of the spring 47 being secured to a spring tension adjusting screw 48 which extends through an opening 49 in the rear end wall 26 and an adjusting nut 50 determines the "return" tension of the spring on the lower ends of the links 39, and "return" pull on the piston rod 31 when the cross pin 45 is "picked up" by the element 43.

As seen in FIGURES 3 and 6 the cylinder supporting member or plate 27 is provided with an offset vertical extension 51 on which is secured a suitable microswitch 52 which is connected in circuit with the spot-welding energizing circuit 3, the microswitch 52 having the usual circuit closing button 52a and an upwardly inclined trigger 52b which is disposed for circuit closing depression by the bottom of the treadle plate 34 (as shown in dotted lines in FIG. 3), during the final downward movement of the treadle 34 by the operator.

Means may be provided for securing the treadle actuator 23 to a supporting surface or floor, adjacent the spot-welding unit 1 if desired to prevent tilting.

In the operation, after the parts to be welded are placed in the gap 21 between the electrodes 19 and 20 and the treadle 34 is initially depressed the toggle action of the links 39 moves the element or slide block 43 to the left (as seen in FIG. 3), along the piston rod 31, out of the way of the cross pin 45, thus allowing the spring 33 to move the piston 32 to displace the hydraulic fluid through the conduit 22 to expand the bellows 18 and move the electrode 19 to exert an initial holding or clamping pressure on the work between the ends of the electrodes.

The clamping pressure of the electrodes is increased by turning adjustment screw 30 clockwise, increasing the loading of spring 33. When slide block 43 has cleared cross pin 45 the spring 33 is delivering the predetermined clamping pressure. Continued depression of the treadle then actuates the microswitch 52.

It is evident that upon release of the clamp screw 11 on the plate 8, the spot-welding head may be adjusted to dispose the work reception gap 21 between a vertical plane as shown in full lines in FIGS. 1 and 4 and a horizontal plane as shown in dotted lines, the flexibility of the braided electrical conductors 12a and 13a and the hydraulic pressure line 22 permitting this adjustment, at least through 90°.

Means may be provided for "bleeding" the system as indicated at 53 in FIG. 5.

Figure 7:
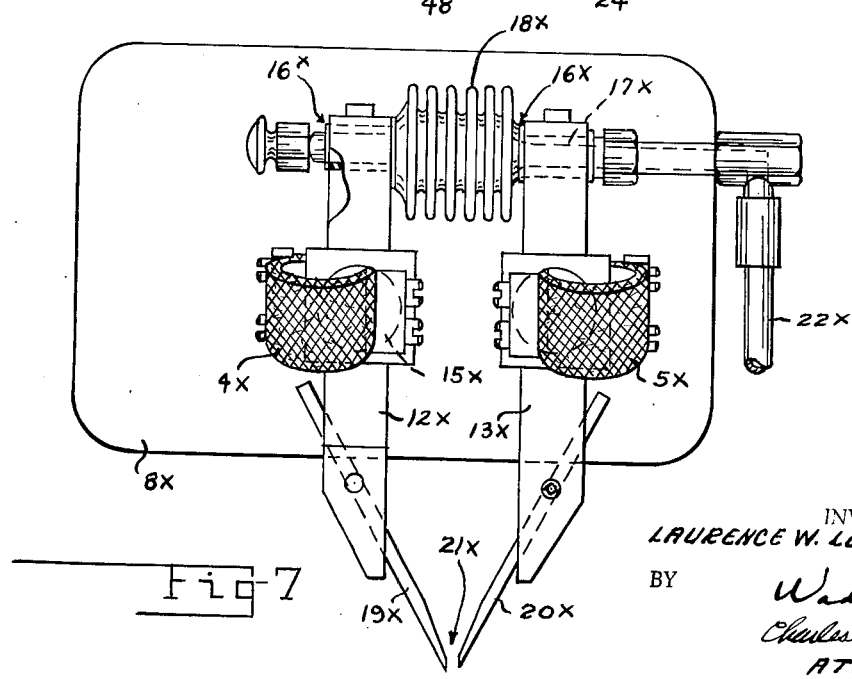
FIGURE 7 is bottom plan view of a modified embodiment of the welding head, showing a different arrangement for the hydraulic bellows device and electrode supports.

In the bottom plan view of a slight modification, as shown in FIGURE 7, the supporting plate is indicated at 8x with the welding electrode supports 12x and 13x disposed parallel to the face of the plate 8x, these electrode supports 12x and 13x comprising centrally pivoted levers, with the metallic extensible bellows 18x interposed between, and fastened to the ends of the electrode supports as shown, the bellows 8x being insulated from the (lever) supports by suitable insulation indicated at 16x.

The outer ends of the pivoted electrode supports 12x and 13x each have one of the welding electrodes adjustably fixed therein in 90° angular relation to each other.

The bellows are preferably resilient and in communication through the conduit 17x with a hydraulic pressure supply conduit 22x leading to the improved treadle actuator 23 as seen in FIGURE 2.

Braided electrical conductors 4x and 5x establish the spot-welding electrical circuit from a power unit (such as 2 in FIG. 2) to the electrode supports 12x and 13x.

Hydraulic pressure applied to the bellows 18x through the conduit 22x rocks the electrode supports 12x and 13x toward each other to close the tips of the electrodes 19x and 20x on the work to be spot welded, when introduced in the gap 21x. Upon release of the treadle the resiliency of the bellows 18x and withdrawal of the hydraulic pressure causes the bellows connected ends of the supports 12x and 13x to be drawn together, thus separating the tips of the electrodes 19x and 20x to release the work from the "gap" between the electrodes.

When the light spring 33 is retained in the hydraulic cylinder 28 it will be evident that during the initial portion of depression of the treadle 34 and movement of the arm 43a of the piston rod actuator 43 thereby to the left, away from the cross pin 45, the spring 30 is sufficient to move the piston 32 to displace the hydraulic fluid from the cylinders 28 to move the electrodes 19 and 20 (or 19x and 20x) relatively toward each other into contact with the work. It should be noted that low inertia is achieved by better balance and decreased weight of moving parts, but in addition the following is true: at the instant of welding the bellows is itself under compression, assisted by fluid under compression due to the action of the compressed spring 33—all attempting to expand, and so doing during the one to five microseconds when fusion at the welding interface occurs. A suitable timer (not shown because not forming a part of the invention) may be incorporated in the power pack for timing the energizing of the welding circuit when the microswitch 52 is closed by depression of the treadle 34.

For purposes of exemplification the particular embodiments of the invention have been shown and described to the best understanding thereof. However, it will be understood that changes and modifications in the arrangement and construction of the parts may be resorted to without departing from the true spirit and scope of the invention as defined in the accompanying claims.

I claim:

1. A spot-welding device comprising a first support, a pair of spaced elongated substantially parallel electrode supports, carried by said first support, means pivoting one of said electrode supports on said first support for movement of one extremity thereof toward and away from an adjacent extremity of the other electrode support, an extensible resilient hydraulic bellows device connected to the pivoted electrode support and extensible for moving the said extremity thereof toward the extremity of the other electrode support, a pair of elongated spot-welding electrodes carried by the adjacent extremities of the electrode supports in equal angular relation toward each other and to the longitudinal axes of said elongated supports to receive the work to be spot welded between the adjacent ends thereof, a fixed resilient hydraulic actuating cylinder connected in communication with said extensible bellows device including a piston movable therein, first spring means for resiliently urging movement of said piston in said cylinder to displace hydraulic fluid from said cylinder into said bellows device for moving said pivoted electrode support extremity toward the extremity of the other electrode support to bring the adjacent extremities of the spot-welding electrodes into yieldable clamping contact with work to be spot welded when inserted between the electrodes, a pivoted treadle member, second spring means for raising said treadle member, means for connecting said treadle member to said piston for retracting said piston to compress the first mentioned spring means incident to the raising of said treadle member by the second spring means, for withdrawing hydraulic fluid from said bellows device to provide for separation of said electrode extremities and removal of the work from between the welding extremities thereof, an electrical spot-welding circuit connected to said elongated electrode supports, and microswitch means for closing said circuit, disposed in the path of depression of said treadle member for energizing said welding circuit upon predetermined depression of said treadle member.

2. A spot-welding device comprising a main support, a pair of spaced elongated substantially parallel electrode supports, means pivotally mounting at least one of said electrode supports for swinging movement on said main support, for swinging an outer portion thereof toward the outer end of the other electrode support, an extensible resilient metallic bellows device connected to said pivoted electrode support for moving the outer end of the last support toward the outer end of the other electrode support upon extension thereof, and away upon retraction thereof, a pair of elongated spot-welding electrodes fixed in the outer ends of said electrode supports in equally inclined angular relation toward each other, and to the axes of the electrode supports to receive work to be welded therebetween, a fixed hydraulic actuator cylinder in communication with said extensible bellows including a piston therein, first spring means for moving said piston in said cylinder to displace a hydraulic fluid therefrom into said bellows device for extending the bellows device to bring said electrode into welding contact with the work interposed therebetween, a pivoted treadle member fixed relative to said cylinder, slidable connecting means between said treadle and said piston for permitting free movement of said piston under influence of said first spring means during depression of said treadle including means for retracting said piston to withdraw hydraulic fluid from said bellows device and compress said first spring means during raising of said treadle member from a predetermined depressed position to separate said electrodes and release the work from between the extremities of the electrodes, or permit insertion of work to be spot welded therebetween, second spring means connected to said treadle member for overriding the compression of said first spring means, to raise said treadle to a nondepressed position and compress said first spring means, a spot-welding electrical circuit connected to said welding electrode supports for energizing said electrodes through work interposed therebetween for spot welding the same when said treadle is depressed to a predetermined degree including microswitch means for energizing the welding circuit fixed in the path of said treadle to be closed thereby upon depression of said treadle to said predetermined degree.

3. In a spot-welding device for fine wires and thin metals, a pair of welding electrode supports, one of said supports disposed for relative movement toward and away from the other, an electrical spot-welding power source having its electrical output terminals connected to said supports to provide a spot-welding circuit, a hydraulic resilient contractable bellows connected to at least one of said electrode supports and extensible for bringing the welding electrode supports toward each other, spot-welding electrodes fixed to the extremities of the electrode supports to be moved away from and toward each other to receive, clamp, and spot-weld work interposed therebetween, a hydraulic cylinder having a piston and connected piston rod therein, conduit means extending therefrom connected to said bellows for extension thereof incident to movement of said piston in one direction, first spring means in said cylinder for yieldably moving said piston therein in said one direction to expel hydraulic fluid from said cylinder, a treadle pivoted at one end for depression thereof to a predetermined degree, slidable link actuator means connected to said treadle in sliding engagement with said piston rod, an abutment on the outer end of said piston rod for impingement by said link means to retract said piston in the opposite direction for withdrawing said hydraulic fluid from said bellows to separate said electrodes when said treadle is raised to a predetermined elevated position, second stronger spring means connected to said treadle for raising said treadle to the last mentioned position a microswitch in said welding circuit fixed relative to said treadle to be closed thereby when said treadle is depressed to said predetermined degree to effect closing of said welding circuit from said electrical welding power source.

4. In a spot-welding device for spot welding fine wires and thin metals comprising, a main support, a welding unit supporting plate pivoted thereon for rotative adjustment about a horizontal axis for adjustments in a vertical plane through an angle of 90°, a pair of welding electrode holders secured in said plate in spaced parallel relation to the relative axis thereof at one side of said axis comprising, a first fixed electrode holder and a second swingable electrode holder pivoted in said plate for movement toward and away from said fixed electrode holder, said electrode holders projecting materially outward perpendicularly from said plate in insulated relation to each other, a pair of spot-welding electrodes fixed in the outer ends of said holders in 90° angular relation to the axes of said holders, inclining toward each other in 90° relation to provide a spot welding, work receiving, gap between the outer extremities thereof, a hollow bellows supporting post fixed in said plate perpendicular thereto in the plane of the axes of said electrode holders, in spaced adjacent relation to said pivoted holder, a resilient hydraulic bellows intermediate said post and said pivoted holder having one end fixed to said pivoted holder and its opposite end fixed to said post in communication with the hollow interior thereof, a power supply unit fixed relative to said main support having spaced electrical spot-welding circuit output terminals, flexible electrical conductors connecting said terminals to said electrode holders to provide for said plate adjustments, a flexible hydraulic conduit connected at one end in communication with the hollow interior of said post, treadle actuating means depressible for introducing hydraulic fluid into said bellows for forcing said pivoted electrode holder toward the other holder to bring said welding electrodes in welding contact with work when interposed between the extremities thereof, welding circuit closing contact means in the path of predetermined depression of said treadle for closing said spot-welding circuit, and spring means for returning said treadle to an initial nondepressed position to withdraw hydraulic fluid from said bellows for separating said welding electrodes from the work.

5. Apparatus as set forth in claim 4 in which said treadle actuating means comprises an elongated supporting base a depressible treadle pivoted at one end to one end of the base, a hydraulic cylinder connected at one end to said hydraulic conduit, a piston for traversing said cylinder, movable toward said one end for forcing hydraulic fluid therefrom to extend said bellows and movable in the opposite direction to withdraw hydraulic fluid from said bellows for contracting the same, a piston rod connected to said piston and projecting out through the other end of said cylinder, an actuating link pivoted at one end to said treadle in spaced relation to the treadle pivot, an elongated U-shaped piston rod actuator pivoted at one end to the opposite end of said link, guide means formed in said base for slidably receiving said U-shaped actuator pivot for sliding engagement in said base in a plane parallel to said piston rod, said link inclining downwardly from said treadle in a direction away from said treadle pivot, said U-shaped actuator having an angular extending portion slidably receiving said piston rod therethrough, an abutment fixed on the end of said piston rod for withdrawing impingement thereon by said U-shaped actuator incident to predetermined elevation of said treadle to an initial nondepressed position, adjustable spring means connected between the U-shaped actuator connected end of said link and said base for returning said treadle to said nondepressed position; a microswitch fixed relative to said base having a circuit closing trigger disposed in the path of final depression of said treadle for closing an energizing circuit to said power supply unit, for energizing said electrodes to spot-weld work to be spot-welded, when interposed between the welding extremities of the electrodes.

6. Apparatus as set forth in claim 5 including a light compression coil spring in said cylinder between said piston and the said other end of said cylinder for moving said piston to displace hydraulic fluid therefrom during initial depression of said treadle for yieldably moving the welding extremities of the welding electrodes toward each other into contact with work to be spot welded when interposed therebetween.

References Cited by the Examiner

UNITED STATES PATENTS

| | | | |
|---|---|---|---|
| 2,369,294 | 2/1945 | Harris | 219—89 |
| 2,506,277 | 5/1950 | Panik et al. | 219—89 |
| 2,859,330 | 11/1958 | White | 219—89 |

RICHARD M. WOOD, *Primary Examiner.*